United States Patent [19]

Breuer et al.

[11] Patent Number: 4,850,761
[45] Date of Patent: Jul. 25, 1989

[54] MILLING PROCESS AND TOOL

[75] Inventors: Edgar Breuer; Philip Costello; Konrad Gondek, all of Rorschacherberg; Andreas Hauswirth, Heiden; Richard Schmid, Rorschacherberg, all of Switzerland

[73] Assignee: Starrfrashaschinen AG, Rorschacherberg, Switzerland

[21] Appl. No.: 105,832

[22] Filed: Oct. 6, 1987

[30] Foreign Application Priority Data

Oct. 8, 1986 [CH] Switzerland .................. 4020/86

[51] Int. Cl.$^4$ ............................................. B23C 9/00
[52] U.S. Cl. ................................... 409/132; 409/191
[58] Field of Search ............... 409/131, 132, 136, 191; 51/33 R; 219/69 M

[56] References Cited

U.S. PATENT DOCUMENTS 3,891,819  6/1975  Ullmann et al. ................. 219/69 W
4,104,943  8/1978  Calderoni ............................. 409/191
4,662,117  5/1987  Korwin et al. ........................ 51/5 R Primary Examiner—Léon Scott, Jr.
Attorney, Agent, or Firm—Helfgott & Karas

[57] ABSTRACT

A process for cutting at least one surface of a workpiece wherein a face milling cutter is used in working the surface in both pulling and pushing cuts and wherein the camber angle as measured with respect to the normal to said surface is maintained at a constant value during both pulling and pushing cuts. A face milling cutter adapted for use in both pushing and pulling cuts and used in the process has an angle of rotation with a selected chamber angle. The cutting face has inside and outside cutting edges which define a polygonal cutting edge geometry and intersect at a selected angle of intersection. The angle of intersection has a line of bisection which as measured with respect to the axis defines an inclination angle generally corresponding to the chamber angle.

11 Claims, 3 Drawing Sheets

MILLING PROCESS AND TOOL

BACKGROUND OF THE INVENTION

The present invention relates both to a milling process and to a milling tool for the cutting of workpieces with flat or curved surfaces.

Of the known milling processes for working curved surfaces, the most frequently used process involves passing a shank end mill with a spherical end, termed a spherical end mill, and using three translatory motion axes at right angels to one another on planar or spatially curved paths over the workpiece. The spatial distance between the sphere center and the surface to be produced is kept constant.

The advantage of this process is it can be used without difficulty on standard milling machines with a corresponding control system and corresponding feed drives. There are also few collision problems. Collision problems arise when certain positions of the milling cutter and its spindle occur during milling when the milling cutter or parts of the milling machine must penetrate the workpiece at undesired points. In particular, these problems arise at re-entrant contours and surface working must be interrupted for avoiding the same. In addition, relative inexpensive tools can be used in this process.

However, in this known process, the adaption between the milling tool and the workpiece is poor. As a result a very large number of milling paths are needed to attain a specific roughness for a workpiece. Moreover, as a function of the construction of the work surface often unfavorable cutting conditions exist.

Another known milling process is circumferential milling with cylindrical or disc-shaped milling tools. In the case of circumferential milling with cylindrical milling tools, the advance or feed takes place in a direction which is substantially at right angles to the milling tool axis. As a result of the collision problems which occur, this process is limited to a few special uses, such as producing turbine blades which are purely cylindrical or the working of certain edges. Attempts are made to bring about optimum adaption between the tool flank or edge and the work surface. In certain applications, this adaption can be improved by the use of special form cutters.

In the case of circumferential milling with disc-shaped milling tools the feed takes place essentially parallel or at right angles to the milling cutter axis. This process has the advantage that more powerful milling tools can be used and these tools will exhibit a high cutting capacity. However, once again collision problems occur, particularly in the case of concave shapes, due both to the position of the cutting spindle (the milling cutter axis is substantially parallel to the work surface or is only slightly inclined with respect thereto, namely max. approx. 30°) and because the diameter of the milling tool cannot be reduced below a certain amount, approximately 25 mm, so that in the case of concave portions with smaller curvature diameters, a collision risk exists. It is also disadvantageous that the milling force acts on the work surface under a relatively steep angle, which can lead to sagging, vibrations and chattering in the case of thin not very dimensionally stiff workpieces, such as turbine blades. Particularly as a result of the aforementioned collision problems, this process is also mainly used for special applications, in particular the machining of turbine blades.

Milling processes referred to as camber milling are also known. The camber is considered to be the inclination of the milling cutter axis to the surface normal at the contact point between the milling cutter and the work surface. The direction of the milling cutter axis is described by angles $\gamma$ and $\delta$. Angle $\gamma$ is formed by the milling cutter axis and the surface normal and is called the camber angle. The second angle $\delta$ is between the projection of the milling cutter axis on the surface, called the "camber" direction; and the feed direction.

In such a known process of the same Applicant (Swiss patent application No. 6727/83) for the machining of blade-like workpieces, the blade edges are shaped by circumferential milling using a cylindrical milling tool, e.g. a shank end mill, along the blade edge generatrixes, while the wide sides of the blades are worked with the face of the shank end mill with camber in interrupted all-round milling, the already shaped blade edges being jumped in rapid travel. Although this process solves the collision problem only slightly less well than in the first mentioned process and also permits better cutting efficiencies to be obtained, considerable time losses occur as a result of the lifted jumping of the blade edges.

In another known camber milling process (German Pat. No. 25 44 612), the blade-like workpiece is machined with a face milling cutter with camber, the feed taking place around the blade. Although here again the collision problems are only solved slightly less well than in the first mentioned process and better cutting efficiencies are obtainable, a relatively large amount of time losses occur in milling round the blade edges.

In camber milling, in which a constant camber angle is maintained, on non-continuous paths (continuous paths can be formed by spiral or helical movements), there is still a considerable time loss on changing from one path to the next, either in the case of only milling in one direction with the return movement taking place with the cutter raised in rapid transit, or in the case of reciprocating milling, in which during each reversal with line jump the milling cutter is raised, the camber angle direction reversed by 180°, followed by the lowering of the milling cutter onto the workpiece again.

In another known camber milling process (U.S. Pat. No. 4,104,943), milling takes place by using a triaxial milling machine both with a pulling out and with a pushing cut, so that a spatially constant angle is maintained between the milling cutter rotation axis and the milling cutter feeds means or machine axes.

In the case of triaxial camber milling of curved surfaces there is a change to the camber angle, i.e. the angle between the milling cutter axis and the local surface normal changes constantly, so that generally unfavorable cutting conditions exist. This has a particular effect during the pushing cut, which is generally very difficult. At the latest it fails when the milling cutter center is pressed into the material surface.

In particular, normal milling cutters are fundamentally unsuitable for camber milling with a pushing cut, so that this process is scarcely used in practice.

SUMMARY OF THE INVENTION

The problem of the present invention is to so develop a process of the aforementioned type that random convex or concave, single or double-curved surfaces can be rapidly and precisely produced by milling.

In accordance with the principles of the invention, a process for cutting at least one surface of a workpiece is disclosed wherein a face milling cutter is used in working the surface in both pulling and pushing cuts and wherein the camber angle as measured with respect to the normal to said surface is maintained at a constant value during both pulling and pushing cuts.

Further in accordance with the principles of the invention, a face milling cutter adapted for use in both pushing and pulling cuts has an angle of rotation with a selected camber angle. The cutting face of the cutter has inside and outside cutting edges which define a polygonal cutting edge geometry and intersect at a selected angle of intersection. The angle of intersection has a line of bisection which is measured with respect to the axes defines an inclination angle generally corresponding to said camber angle.

The foregoing as well as additional objects and advantages of the invention will either be explained or will become apparent to those skilled in the art when this specification is read in conjunction with the brief description of the drawings and the detailed description of the preferred embodiments which follow.

DETAILED DESCRIPTION OF THE PREFERRED EMBODIMENTS

Figure 1:
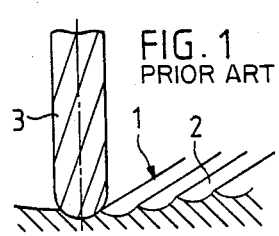
FIG. 1 illustrates the prior art process of milling with a spherical head shank.
Figure 2:
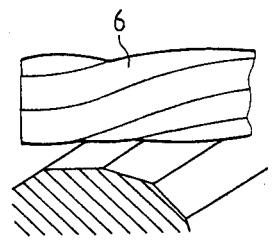
FIG. 2 illustrates the prior art process of circumferential milling with a cylindrical milling cutter.
Figure 3:
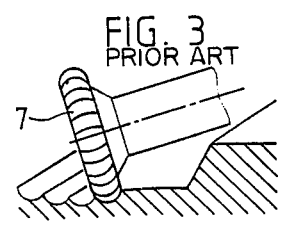
FIG. 3 illustrates the prior art process of circumferential milling with a disc-shaped milling cutter.

FIGS. 1 to 5 diagrammatically show the known milling processes referred to hereinbefore, FIG. 1 showing the working of a curved surface 2 of a workpiece 1 with a spherical head milling cutter 3 and FIG. 2 circumferential milling with a relatively slender, cylindrical shank end mill 6. In. FIG. 2 feed takes place substantially at right angles to the milling cutter axis, the tool flank or edge being adapted in an optimum manner to the tool surface. However, collision problems occur, as described hereinbefore. In the case of circumferential milling with a disc-shaped tool 7, cf. FIG. 3, feed can take place substantially parallel or at right angles to the milling cutter axis. This leads to the aforementioned collision problems, particularly in the case of concave surfaces, due to the milling spindle on the one hand and the fact that the milling cutter diameter cannot be reduced on the other.

Figure 4:
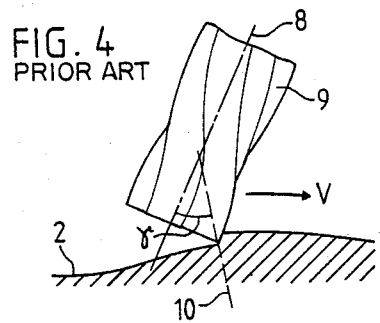
FIGS. 4 and 5 illustrated prior art processes of camber milling.
Figure 5:
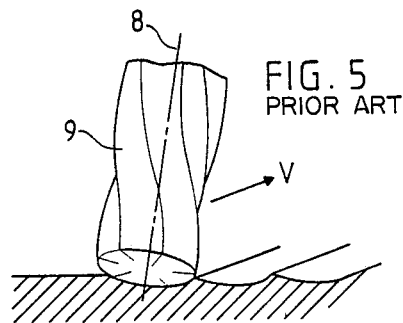

In the case of camber milling according to FIGS. 4 and 5, the axis of the milling cutter 9 is inclined by the camber angle $\gamma$ with respect to the normal 10 of surface 2. As the feed direction V takes place in the slope direction of the milling cutter axis, milling takes place here with a pulling cut and FIG. 5 shows the resulting flat milling paths.

All the milling processes according to FIGS. 1 to 5 are based on the pulling cut, in which through a corresponding forward inclination of the cylindrical shank end mill a shaving or trimming of the rear milling cutter edge is reliably avoided, because the pushing, pressing or dipping cut of the milling cutter face which occurs during said shaving is considered to be poor and uneconomic and therefore to be avoided. As stated hereinbefore, in part collision problems occur.

Figure 6:
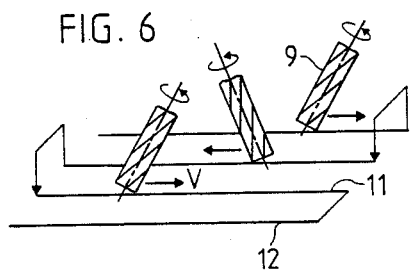
FIG. 6 is a diagrammatic representation of camber milling using a reciprocating movement of the cutter.
Figure 7:
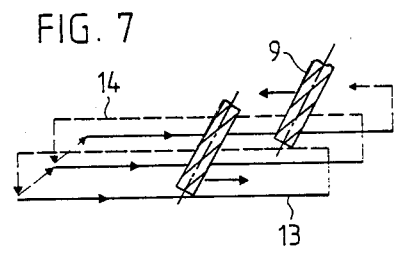
FIG. 7 is a presentation similar to FIG. 6 except that the cutting movement is in only one direction.

As a result of the opinion that only the pulling cut is admissible due to its advantages, the time loss when working surfaces occurs, cf. FIGS. 6 and 7. If the milling cutter 9 is to mill with a pulling cut both during forward travel 11 and return travel 12, the milling cutter must be raised with line jump during each reversal, the direction of its camber inclination is reversed by 180° and then the milling cutter is again lowered onto the workpiece. Moreover, with a constant rotation direction of the milling cutter, milling takes place in climb-cut in one milling direction and in cut-out in the other milling direction.

However, if milling only takes place in one direction 13, cf. FIG. 7, the return movement 14 takes place in rapid transit with the milling cutter raised. There is a corresponding time loss in both cases.

The invention is based on the idea that it is possible to perform camber milling with the camber direction at a random angle to the feed or advance direction, if use is made of a suitable face milling cutter. It is now possible to completely mill a surface without time losses cases by idle movements or poor cutting efficiency. If e.g. this surprising find is used in the reciprocating camber milling of a surface, then both during forward travel 11 with pulling cut, cf. FIG. 8 and during return travel 12 with pushing cut, cf. FIG. 9, the same cutting conditions occur, i.e. only climb-cut or only out-cut, as do the same collision conditions, because there is no change in the position of the tool with respect to the workpiece on reversal.

Figure 8:
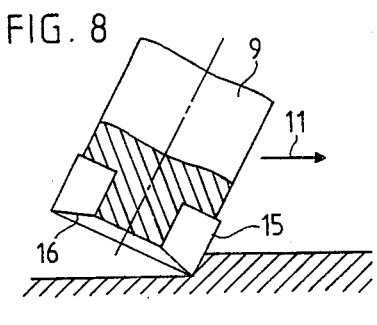
FIG. 8 illustrates milling in the forward direction in accordance with the invention.
Figure 9:
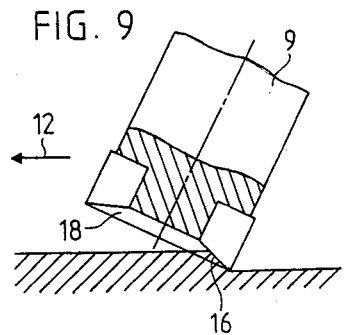
FIG. 9 is an illustration similar to FIG. 8 except that milling is in the reverse direction.

It can be seen from FIGS. 8 and 9 that the milling cutter, as a conventional face milling cutter, has different engagement or contact conditions during forward travel 11 and return travel 12. To enable the process to be performed in an optimum manner, it is necessary to construct the milling cutter in such a way that it cuts both on the circumference 15 and on the end face 16 and has an adequate chip space 18.

Figure 10A:
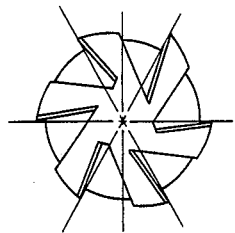
FIGS. 10a and 10a' are a plan view and a bottom view respectively of the cutting face of the cutter shown in FIG. 10.
Figure 10A:
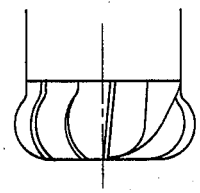
Figure 10:
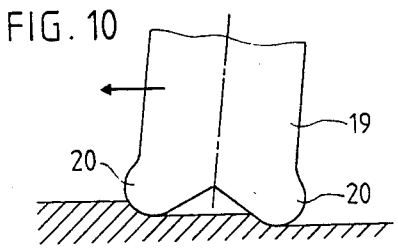
FIG. 10 illustrates step milling using a face milling cutter in accordance with the invention.

In FIGS. 8 and 9 it is assumed that the material layer to be removed only has a thickness such that only the rear, lower milling cutter part cuts during the pushing cut. If this condition is not fulfilled then both the front and the rear part of the milling cutter come into action in pushing or dipping cut as shown in FIGS. 10 and 10a. Milling consequently takes place in two steps, so the process is appropriately called step milling. The working or machining of a surface then takes place during pushing or dipping milling as step milling alternating with pulling chamber milling.

Figure 11:
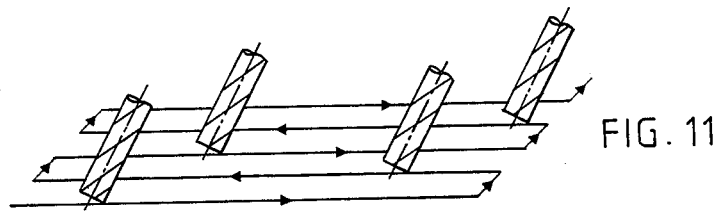
FIG. 11 illustrates camber milling in accordance with the invention showing outward pulling and return pushing movement.

Due to the fact that milling can take place both with a pulling and a pushing cut, a reciprocating milling process is possible, as shown in FIG. 11, in which all the idle movements occurring in the processes of FIGS. 6 and 7 are cancelled out, which leads to a considerable time saving.

Figure 14A:
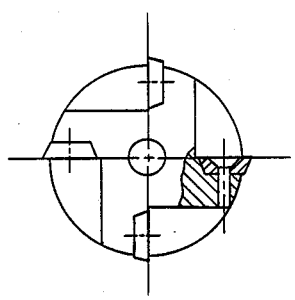
FIGS. 14a and 14a', are a plan view and bottom view respectively of one form of the cutter shown in FIG. 14.
Figure 14B:
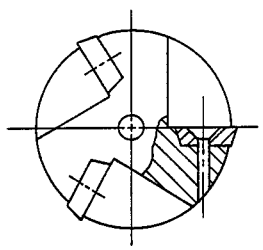
FIGS. 14b and 14b', are a plan view and bottom view respectively of another form of the cutter shown in FIG. 14.
Figure 15A:
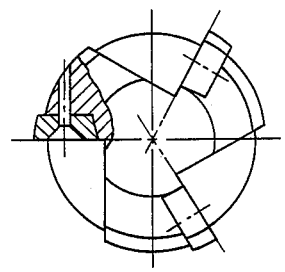
FIGS. 15a and 15a' are a plan view and bottom view respectively of the cutter shown in FIG. 15 and, alternatively, of the cutter shown in FIG. 16.
Figure 14A:
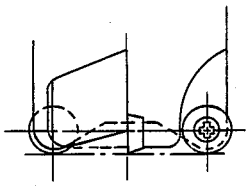
Figure 14B:
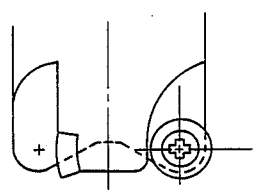
Figure 15A:
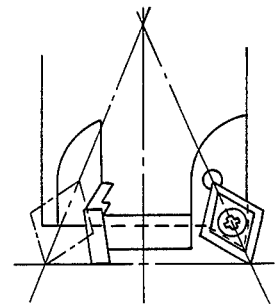
Figure 15:
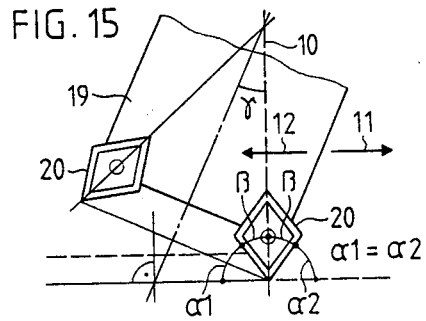
FIG. 15 is a side view of another milling cutter in accordance with the invention.
Figure 16:
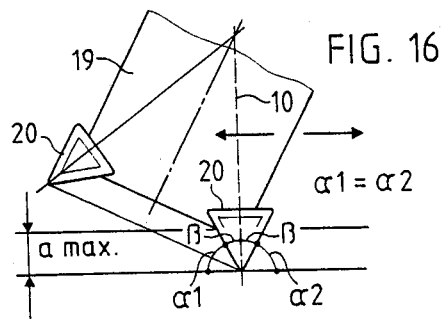
FIG. 16 is a side view of yet another milling cutter in accordance with the invention.

FIGS. 14, 14a, 14b, 15, 15a and 16 show face milling cutters 19, which satisfy in an optimum manner the requirements of the described process and as is best shown by FIGS. 15 and 16. The normal 10 subdivides the angle of the two lower cutting edges of the cutting bit 20 into two equal angles $\beta$. This means that also the angles of the cutting edges to the surface $\alpha_1$ and $\alpha_2$ are identical. Angle $\gamma$ then corresponds to the camber angle. The conditions do not change if the rhombic cutting bit 20 is replaced by a square, triangular or circular cutting bit. These geometric features are not limited to milling cutters with cutting bits and can also be realized on integral milling cutters.

A milling cutter constructed in this way makes it possible to perform five-axis camber milling with pushing and pulling cut, similar to the described process, but through the incorporation of a fourth (rotation) and fifth (tilting) axis, takes place with a constant camber angle with respect to the local surface normal to the work surface. However, whereas the cutting conditions during the pushing cut in the case of milling cutters not specially constructed for this purpose are normally very unfavorable, the present tool permits camber milling with pushing or dipping cut of the same quality as the camber milling with a pulling cut. If the pushing or dipping milling process, which can also be referred to as pushing or dipping milling with a negative camber, is performed in alternation with the pulling camber milling during a reciprocating working it is possible, as stated, to completely mill a surface, without any time loss due to idle movements or poor cutting efficiency. Due to the alternation between pushing/dipping and pulling cut, this type of working can also be called push and pull milling. FIG. 11 shows the working or machining types.

Figure 12:
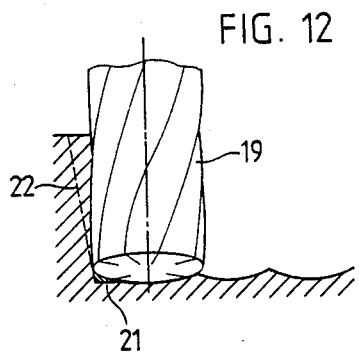
FIG. 12 illustrates diagrammatically a collision problem.
Figure 13:
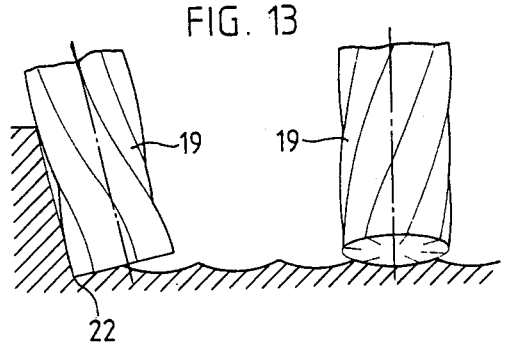
FIG. 13 illustrates a solution to the problem of FIG. 12.
Figure 14:
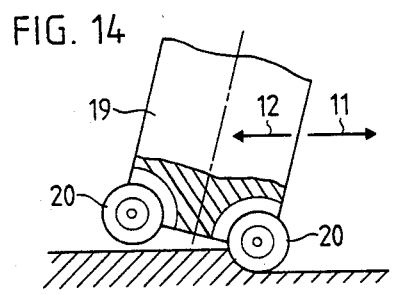
FIG. 14 is a side view of a milling cutter in accordance with the invention.

In all camber milling processes i.e. also in the present process no matter whether of the pulling or the pushing/dipping type, the disadvantage exists that as a result of the good adaption of the milling cutter to the work surface, under certain conditions, there are poor approaches to re-entrant corners, e.g. on a wall, cf. FIG. 12. In the latter, both at corner 21 and at the desired contour of wall 22 indicated in broken line manner there is much superfluous material due to the collision between milling cutter 19 and corner 21. According to the invention this problem can be obviated in that the direction of the camber angle located in the movement direction is turned in the vicinity of wall 22 transversely with respect thereto, so that the re-entrant corner is directly accessible to the milling cutter corner, which is angular or preferably rounded and also the actual contour can approach the desired contour, cf. FIG. 13.

Within the context of the present invention, particular significance is attached to the construction of the cutting edges in the form of circles or arcs, as shown in FIGS. 10, 10a, 14, 14a and 14b. Due to the fact that this geometry satisfies the symmetry condition for all camber angles, it is particularly suitable for working difficult workpieces, where it is not always possible to maintain a constant camber angle. The difference in FIGS. 14a and 14b is in the number of cutting edges. Both of these faces can be used in the cutter shown in side view in FIG. 14.

Therefore this cutting edge geometry can be used for camber milling according to FIGS. 10 and 10a, said milling process with large material addition as or tolerances permits the use of small camber angles, i.e. flat milling lines, in pushing cut. The effect of step milling is not achieved through a special construction of the tool, but by the ratio of the depth of cut to the setting height, i.e. is a function of the camber angle of the tool diameter and the corner radius. It is therefore also possible to randomly choose the depth of cut of the finishing cut between maximum and zero. In addition, in the case of camber milling with camber, contact angles up to 360° are possible, so that the milling process is extremely quiet due to the particular engagement or contact conditions. The maximum is approximately 180° in the known circumferential face millings.

Whale the invention has been described with detailed reference to the drawings, it will be obvious to those skilled in the art that many modifications and changes can be made within the scope and sphere of the invention as defined in the claims which follow.

What is claimed is:

1. A process for cutting at least one surface of a workpiece wherein a face milling cutter is used in working the surface in both pulling and pushing cuts and wherein the camber angle as measured with respect to the normal to said surface is maintained at a constant value during both pulling and pushing cuts.

2. The process of claim 1 wherein the surface can be curved or flat.

3. The process of claim 2 wherein the cutter has a cutting face with inside and outside cutting edges which define an essentially symmetrical arrangement with respect to said normal.

4. The process of claim 3 wherein the camber angle is sufficiently large to cause the outermost portion of the cutting face to be spaced away from said surface during a pushing cut whereby this portion does not cut.

5. The process of claim 3 wherein the camber angle is sufficiently small to cause the outermost portion of the cutting face to engage and step mill said surface.

6. The process of claim 3 wherein the workpiece is a turbine blade which extends longitudinally and wherein both pulling and pushing cuts are made in opposite directions along the longitudinal extension.

7. The process of claim 3 wherein the cutter is used to mill reentrant corners and wherein the camber angle is set at right angles to the direction of feed when the cutter is so used.

8. A face milling cutter adapted for use in both pushing and pulling cuts, said cutter having an angle of rotation with a selected camber angle, the cutting face having inside and outside cutting edges which define a polygonal cutting edge geometry and intersect at a selected angle of intersection, said angle of intersection having a line of bisection which as measured with respect to the axis defines an inclination angle generally corresponding to said camber angle.

9. The cutter of claim 8 wherein the cutting edges are circular.

10. The cutter of claim 9 wherein the edges have inner and outer cutting edge parts which project beyond the milling face.

11. The cutter of claim 10 wherein said parts project so far that cutting edge parts symmetrical with respect to the normal to the surface of a workpiece being cut can be used for working.

* * * * *